Patented Mar. 5, 1935

1,993,598

UNITED STATES PATENT OFFICE 1,993,598

REFRACTORY METAL COMPOUND AND PROCESS OF MAKING THE SAME

Jean Hubert Louis De Bats, East Orange, N. J.

No Drawing. Application December 12, 1931,
Serial No. 580,727

10 Claims. (Cl. 75—1)

This invention relates to an improved alloy composition which possesses a high degree of resistance to impact and shock and is particularly adapted for abrasion and cutting purposes. The invention also pertains to the process of preparing this improved alloy composition.

More particularly the invention relates to alloy compositions or complexes comprising any of the carbides, silicides, borides, tellurides and like stable compounds of tungsten, tantalum, molybdenum and like metals which are characterized by a high hardness. Such compositions have been proposed heretofore for use in cutting and abrading tools, but difficulty up to this time has been experienced in satisfactorily forming them into suitable tools due to their lack of strength and tendency to shatter when used alone. To overcome this difficulty it has been proposed to form cutting edges of such materials by cementing them together with a bonding material, to form an aggregate comprising the abrasive or cutting particles embedded in a matrix of a softer cementing material. The toughness of the cemented aggregates is usually relatively low, and is dependent upon the particle size of the components. This process relating to the aggregate is commonly referred to as sintering and the resulting conglomerate or composite as a cemented and/or sintered product. Such sintered products are thereafter applied or affixed to tool bodies by brazing them in place. Such composite tools have rather limited application due to their inherent brittleness which necessitates extreme care during the brazing or mounting operation as well as in application and limits the scope of use of such tools in actual service. Such tools are not, therefore, of general utility, and their applications are restricted to a fairly limited field.

It is an object of the present invention to provide an improved alloy composition adapted for general use in tools, and in other products which give a relatively high degree of resistance to wear as well as to impact and shock.

It is another object of this invention to provide such an improved alloy comprising a complex carbide or like material and to provide an improved process for making same.

These and other desirable objects of the present invention will be described in the accompanying specification, certain preferred embodiments being given by way of illustration only, for since the underlying principles may be applied to other specific compositions and methods of making same, it is not intended to be limited herein to those here described as examples except as such limitations are clearly imposed by the appended claims.

Briefly considered the present invention relates to the preparation of a complex material such as a tungsten carbide reacted with or combined with a metal such as cobalt in an improved manner to thereby form a novel and exceptionally useful composition which is particularly adapted for use in tools of various kinds and more particularly adapted for use in cutting tools and other devices or complete products subjected to abrasion, wear, impact and shock.

In the preferred practice of the present invention a mixture of tungsten carbide and cobalt in a suitable state of division and in amounts sufficient to give an alloy having the desired properties, is subjected to reaction under conditions adapted to aid in the formation of a tungsten carbide-cobalt compound. The reaction mixture is raised to at least a temperature required to initiate reaction between the components and is thereafter, if desired, raised to a degree sufficient to cause an incipient fusion of the reactive mass. The incipiently fused mass may then be compressed, extended, forged or mechanically hot worked in any manner to any desired shape, or it may be carried to "liquid" fusion and cast to shape. In addition, the incipiently fused material may be allowed to solidify and be placed in stock, or broken up and ground to any suitable degree of fineness and used as the abrasive component of a cemented carbide composition.

While tungsten carbide and cobalt have been given as illustrations of materials suitable for the preparation of the improved alloy composition of the present invention it will be understood that they are illustrative of other materials which are susceptible of treatment by the process of the present invention. Among such materials may be mentioned the carbides, silicides, borides, tellurides, etc., of tantalum, molydenum, etc., as equivalents to a greater or less degree of tugnsten carbide, and iron or nickel as equivalents to a greater or less degree of cobalt.

In the heating of the initial mixture the temperature and time of reaction are so controlled as to permit a grain formation of the reaction product. When this condition of grain formation or grain growth is reached it is usually perceptible by the forming of a more or less soft, viscous, spongy and hot workable condition of the mass. The spongy appearance or structure of the solid, yet hot-workable mass may appropriately and, perhaps, more accurately be described as cavitate or expanded.

The initial mix contains finely pulverized tungsten carbide and cobalt, preferably in amounts wherein the carbide ranges from 70% up and the cobalt or its equivalent to properly balance the composition for the purpose or use desired. When there is an exceptionally high carbide content then there will be employed sufficient cobalt to be effective.

One mixture of finely pulverized tungsten carbide and cobalt, in amounts comprising 70 to 99% of the carbide to 30 to 1% of cobalt may be weighed up on a balance and thereafter placed in a crucible. A specific illustration of the invention is to mix 85% of the finely pulverized tungsten carbide with 15% of comminuted cobalt and thereafter place this mix in a crucible. The fineness of the initial mix as is common in chemical reactions, determines the speed of reaction and is not necessarily a function of the final characteristics of the finished article as is the case in the cemented or sintered tools. The crucible may be fitted with a removable bottom, and, if desired, it may also be conformed to give a blank of approximately the shape of a slug or finished article. The crucible and its contained mass, which may have been previously tamped or otherwise packed, are then introduced into a suitable furnace and preferably heated or subjected to a desired temperature. Usually and preferably there is a progressively increasing temperature.

The material may also be formed up into suitable shapes without the use of extraneous supports, and the so-formed material may be placed in the furnace and treated in the manner above described.

When a temperature of about 1000 to 1400° C. is attained, there is observed a shrinking of the mass in the crucible away from the sides of the latter. If samples be taken of the material at this stage it will be observed that the mass exhibits somewhat of a porous texture or may be said to include small cavities. After continued heating at increased temperatures up to about 1800° C. and above, depending upon the composition of the original mix, or at a temperature where incipient fusion occurs, the cavities in the heated mass are appreciably larger in size and a fractured sample reveals marked evidence of a granular or crystalline structure.

The mass is then heated to the point of incipient fusion or above, depending upon the after treatment and the intricacy and shape of the article to be formed. Incipient fusion and the associated pastiness of the mass is preferably determined in practice by the testing of the mass with a carbon rod. This is desirable for the want of suitable quick reading temperature measuring means adapted for commercial use in the temperature ranges here involved.

The alloy or reacted composition thus produced is now available for a variety of uses. Owing to the porous structure and viscous soft or "pasty" condition of the incipiently fused mass it is usual to compact the same in order to secure the optimum advantages from the material in actual use. Therefore, while still in the soft incipiently fused hot or workable state it may be subjected to external pressure converting the cavitate structure, previously noted, through its welding together under pressure into a homogeneous dense solid mass which is adapted for abrasion and cutting purposes and which possesses a relatively high degree of resistance to wear and to impact and shock. It is noted that the increased plastic flow or a more "liquid" state of the heated mass is encountered on the application of pressure in the hot working operation, and thus this application of external pressure is a marked feature for the "hot working" or shaping of extremely high temperature melting materials in the mounting of cutting surfaces on tools or the application of such materials as wear, shock and/or impact resistant facings or surfacings of any kind without requiring the use of an interposed braze or the preformation of the cutting or wearing elements.

The application of external pressure is continued after the initial press in order to keep the body in plastic condition for as long as desired. This permits the natural relief of any internal strains which may develop in mounting or surfacing operations.

As noted hereinabove this external pressure and working or forming of the heated refractory mass may desirably be by pressing or forging same, after being removed from the furnace, and, therefore, at a falling temperature gradient. It can be appreciated that when heat is no longer applied to the refractory mass, and before the actual forming pressures are applied, falling temperatures of the mass will ensue. The rate of heat drop and the extent of loss of heat in the mass will vary for many reasons, one of the governing conditions being the size, bulk, or mass of the material being treated. This fall in temperature, loss of heat, or heat drop, as noted above, may conveniently and generally be expressed by the term, a falling temperature gradient.

In practice, the product, after being brought to the desired heat, is preferably removed from the furnace and placed in a mold, or other suitable forming device, and pressed. The resulting product will have the form of the mold or of the confining walls. The mold or forming device may be so prepared that it will accept a tool shank, base, or other support upon which the material under treatment is to be applied as a wearing, cutting or abrading surface. In cases where the material under treatment is simply to be formed as a unit and not as a part of a composite tool or other body, there is formed a body of the material itself such as a slug, billet or ingot which may later be subjected to other hot treatment such as forging, hammering, rolling or drawing.

It will also be understood that while it is preferable to remove the material under treatment from the furnace before pressing, that, where large size bodies are to be treated and where suitable furnace apparatus allows, the pressing may be done in the furnace after the material has been brought to the desired temperature.

The incipiently fused mass is also adapted for use in centrifugal casting of tool facings, miscellaneous shapes or nibs, and other wear resisting tool and machine parts. Where desired the mass may be liquefied by fusion and cast into any desired form with or without pressure.

While cobalt has been specified as the preferred alloying agent, it will be understood that either iron or nickel may be used in lieu thereof or in admixture in any desired proportion.

While the preferred embodiment herein disclosed is directed to carbide alloys having the particular properties of wear resistance and resistance to impact and shock, the invention also comprehends the method herein disclosed for the forming of a wide variety of alloys. These alloys may be made from their respective components which have been initially reduced to a desired state of fineness, and then subjected to the method steps herein described with the result that the products so made will be found free from segregation, pipes, blow holes, and other deleterious conditions normally found in the preparation of billets or ingots, and also free from undesirable inclusions or constituents encountered in commercial practice.

When the material has been brought to a sufficiently high temperature to allow it to be flowed, it may be centrifugally cast into a mold or other suitable device. Thus, the improved material may be formed on a tool body or other body, or may be formed as a slug, billet or ingot by the centrifugal operation. Such centrifugal operation also requires the removal of the heated product from the furnace to the centrifugal casting apparatus.

In either the centrifugal casting method, or the pressure method, it has been noted that the resulting product has a desirable fineness of structure, and it is believed that this improved structure is of particular merit in products employed for the uses herein outlined by reason of the physical characteristics of those finished products. It may be stated that the fine-grained structure obtained may be due to the high pressure and the solidification under pressure, both the high pressure and solidification usually being simultaneous. It is believed that solidification under relatively high pressure will substantially always give a most desirable fineness of grain structure.

The alloy mass, in its incipiently fused state, may be treated as indicated above, or it may be permitted to cool and then stored. This stored material may be reheated later to any degree of plasticity and treated as desired, or it may be broken up and ground to any suitable state of fineness and used as an abrasive ingredient in cutting compositions or tools. In fact, the improved composition herein, after being broken up and/or ground, may even be used as an abrasive element in cemented or sintered articles. While the carbide component has been spoken of as tungsten carbide, it will, of course, be appreciated that the separate components of the carbide may be added as such in the form of metallic tungsten and carbon in suitable amounts.

It will now be noted from the foregoing general and specific descriptions and examples that an improved alloy composition, having high resistance to impact and shock while being particularly adapted for abrasion and cutting purposes, has been herein disclosed.

The improved products herein embody greater resistance to impact and shock, retaining their hardness due to their capacity to resist decomposition and disintegration resulting from the high heats encountered in operation.

This unique combination of characteristics has extended the field of application of hard, refractory tools beyond anything hitherto attainable. The ability of these improved products to remain stable under exceptionally difficult working conditions, has been demonstrated in actual service.

It is believed that these improved products are enabled to meet excessive working demands by reason of the components attaining a state of equilibrium resulting from the practice of the improved process herein. Whether this explanation accords or not with what may later be found to be the proper theory, it has been found that the actual results are exceptionally satisfactory and that the products successfully and efficiently meet new and added demands.

It will also be noted that the simple and relatively short method or process of producing these improved products, permits ready and easy production in a cheap yet efficient manner.

While the foregoing description has been set forth in general and in detail in respect to specific ideas, it will be understood that changes and modifications may be made therein and that such changes and modifications are to be considered within the scope of the invention as defined in the subjoined claims.

What is claimed is:

1. The method of forming improved refractory alloys comprising reducing alloy components to a desired particle size, intimately mixing the components, compacting the mixture, furnacing same at a temperature at least sufficient to initiate reaction between the alloy components, said temperature being of the order of 1800° C., removing the so-reacted mass from the furnace while still highly heated and subjecting it to a pressure sufficient to render the heated mass fluid and assure completion of the reaction.

2. The method of forming improved refractory alloys, comprising the steps of intimately mixing suitably sized and proportioned alloy constituents, compacting same, furnacing the compacted mass at temperatures at least sufficient to initiate reaction between the components, said temperature being of the order of 1800° C., removing the so-reacted mass from the furnace and compressing same while still highly heated, whereby to form ingots free from pipe, segregations, blow holes and other undesirable inclusions.

3. The method of forming improved refractory alloys, said method comprising the steps of reducing the alloy components to a desired particle size, intimately mixing the said components, compacting the mixture to permit handling, introducing the compacted mass into a suitable furnace, heating to a temperature sufficient to at least initiate reaction between the components, said temperature being of the order of 1800° C., and thereafter removing the so-reacted mass from the furnace and while still highly heated compressing to a desired form whereby the mass is flowed under the conjoint action of the retained heat of the body and the applied pressure.

4. In the method of forming improved alloys as set forth in claim 3, the step of refining the grain of the alloys formed comprising solidifying the mass under pressure and at a falling temperature gradient.

5. The method of forming improved alloys including complex refractory carbides, said method comprising the steps of heating a refractory carbide material in admixture with an alloying agent to at least a temperature sufficient to initiate reaction of the components, said temperature being of the order of 1800° C. and compressing the so reacted mass as by forging while heated and without addition of external heat whereby to complete the reaction and form the mass at a falling temperature gradient.

6. The method of forming an improved alloy comprising heating 70 to 99% of tungsten carbide in admixture with 30 to 1% of cobalt to a reacting temperature, of the order of 1800° C., increasing the temperature of the reacting mass to produce a semi-viscous state determined as the point at which a carbon rod will penetrate into the interior of the mass, but at which point the body still retains its externally solid form, and compressing the resulting mass as by forging while in such state and without application of externally applied heat.

7. The method of forming improved alloys, including complex refractory carbides, comprising the steps of heating a refractory carbide material in admixture with an alloying agent to at least a temperature sufficient to initiate reaction of the components, said temperature being of the order of about 1800° C. and above, maintaining the mass at said temperature and above whereby to complete reaction of the components and to induce in the said mass a semi-viscous yet solid cavitate condition, compressing the so-reacted and swollen, expanded mass in the absence of applied heat and at a falling temperature gradient, and thereafter reducing the so-compressed mass to a desired particle size.

8. The method of forming an improved alloy comprising heating a mixture of substantially 85% tungsten carbide and substantially 15% cobalt to a reacting temperature of the order of 1800° C. and above, thereafter increasing the temperature of the so-heated mass sufficiently to cause the same to assume a semi-solid, expanded, cavitate condition, determined as the point at which a carbon rod will penetrate into the interior of the mass, but at which point the body still retains its external, solid form, and thereafter centrifugally forming the said mass by placing same in a rotating cylindrical machine and in the absence of continued heat.

9. A hard metal body composed of an alloy of tungsten, carbon and one or more of the group comprising iron, nickel or cobalt, the tungsten and carbon being present in amounts sufficient to form tungsten carbide and the latter being in turn present in quantity sufficient to comprise 70–99% of the finished alloy, the said alloy having a crystalline structure resulting from heating the said ingredients and without melting to an alloying temperature of the order of 1800° C. and above, and the so-heated mass immediately thereafter forged at such high heats and without extraneously and continuously applied heat.

10. A hard metal body composed of an alloy of tungsten, carbon and one or more of the group comprising iron, nickel or cobalt, the tungsten and carbon being present in amounts sufficient to form tungsten carbide, and the latter being in turn present in quantity sufficient to comprise 70–99% of the finished alloy, the said alloy having a crystalline structure resulting from heating the said ingredients, in particle form, to an alloying temperature of the order of 1800° C. and above and without melting, and the so heated, unmelted but formable mass immediately thereafter forged at such high heats and without application of additional heat.

JEAN HUBERT LOUIS DE BATS.